US009189261B2

(12) United States Patent
Masood (10) Patent No.: US 9,189,261 B2
(45) Date of Patent: *Nov. 17, 2015

(54) SAVING, TRANSFERRING AND RECREATING GPU CONTEXT INFORMATION ACROSS HETEROGENEOUS GPUS DURING HOT MIGRATION OF A VIRTUAL MACHINE

(71) Applicant: Advanced Micro Devices, Inc., Sunnyvale, CA (US)

(72) Inventor: Tariq Masood, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/782,172

(22) Filed: Mar. 1, 2013

(65) Prior Publication Data

US 2013/0179884 A1   Jul. 11, 2013

Related U.S. Application Data

(63) Continuation of application No. 12/575,780, filed on Oct. 8, 2009, now Pat. No. 8,405,666.

(51) Int. Cl.
*G06T 1/20* (2006.01)
*G06F 9/455* (2006.01)

(52) U.S. Cl.
CPC ............ *G06F 9/455* (2013.01); *G06F 9/45558* (2013.01); *G06T 1/20* (2013.01); *G06F 2009/4557* (2013.01)

(58) Field of Classification Search
USPC ....................... 345/502–506; 718/1
See application file for complete search history.

(56) References Cited

U.S. PATENT DOCUMENTS

| 7,421,694 | B2 | 9/2008 | Gosalia et al. |
| 7,558,939 | B2 | 7/2009 | Banerjee et al. |
| 7,586,492 | B2 | 9/2009 | Riach et al. |
| 2006/0146057 | A1 | 7/2006 | Blythe |
| 2010/0115249 | A1 | 5/2010 | Paltashev et al. |
| 2010/0131944 | A1 | 5/2010 | Iorio et al. |
| 2011/0169844 | A1 | 7/2011 | Diard et al. |

*Primary Examiner* — Stephen R Koziol
*Assistant Examiner* — Robert Craddock
(74) *Attorney, Agent, or Firm* — Volpe and Koenig, P.C.

(57) ABSTRACT

A system and method are disclosed for recreating graphics processing unit (GPU) state information associated with a migrated virtual machine (VM). A VM running on a first VM host coupled to a first graphics device, comprising a first GPU, is migrated to a second VM host coupled to a second graphics device, in turn comprising a second GPU. A context module coupled to the first GPU reads its GPU state information in its native GPU state representation format and then converts the GPU state information into an intermediary GPU state representation format. The GPU state information is conveyed in the intermediary GPU state representation format to the second VM host, where it is received by a context module coupled to the second GPU. The context module converts the GPU state information related to the first GPU from the intermediary GPU state representation format to the native GPU state representation format of the second GPU. Once converted, the GPU state information of the first GPU is restored to the second GPU in its native GPU state representation format.

18 Claims, 6 Drawing Sheets

SAVING, TRANSFERRING AND RECREATING GPU CONTEXT INFORMATION ACROSS HETEROGENEOUS GPUS DURING HOT MIGRATION OF A VIRTUAL MACHINE

BACKGROUND OF THE INVENTION

1. Field of the Invention

The present invention relates in general to hosting graphics processing at a centralized location for remote users, and more particularly to recreating graphics processing unit state information associated with a migrated virtual machine.

2. Description of the Related Art

The migration of a virtual machine (VM) is an integral capability within virtualized environments, enabling load-balancing, support for fail-over, and efficient use of heterogeneous physical resources. When a VM is migrated, its state in the current environment is captured, saved, transferred, and then recreated in the new environment. This process is simple when the VM is isolated from the underlying physical properties of the VM host. However, with device assignment capabilities, such as those realized by the implementation of an input/output (I/O) memory management unit (IOMMU), I/O devices coupled to the VM host can be controlled directly by the VM.

This ability leads to a number of challenges. For example, the state of the assigned device, such as a graphics device comprising a GPU, must be captured correctly. When operating a GPU, a current state and context of a GPU is commonly comprehended as a disjoint set of internal registers, Z buffer contexts, frame buffer contents and texture map storage buffers. Context switching within a single operating system image involves a number of serial steps orchestrated by the operation system. The GPU may autonomously save and restore internal state and notify the operating system when the operation is completed. However, if one or more GPUs are to be shared efficiently among multiple applications executing under multiple virtual machines, each executing a graphically oriented operating system and perhaps generating composited graphics on separate thin clients (such as in a hosted graphics environment), migrating a GPU context can be challenging.

Moreover, this issue becomes more challenging when migrating a VM between physical VM hosts. In particular, the captured state of the GPU must be visible to the current VMM so it can be transferred correctly through the receiving VMM to a new assigned device, such as a heterogeneous graphics device coupled to the target VM host. In addition, the software running in the migrated VM must work properly with the new assigned device in the new environment. These issues become even more challenging when the two assigned devices maintain their internal state in different formats. In the case of graphics devices comprising a GPU, context information can be very large and are typically stored in a native format that is incompatible with other GPUs. As a result, VM migrations involving GPU state information can prove difficult and sometimes impossible.

SUMMARY OF THE INVENTION

A system and method are disclosed for recreating graphics processing unit (GPU) state information associated with a migrated virtual machine (VM) as a result of a context switching operation. In various embodiments, a VM running on a first VM host coupled to a first graphics device, comprising a first GPU, is migrated to a second VM host coupled to a second graphics device, in turn comprising a second GPU. A context module coupled to the first GPU reads its GPU state information, which is stored in its native GPU state representation format. The context module then converts the GPU state information into an intermediary GPU state representation format such that it can be read by a first virtual machine manager (VMM) running on the first VM host.

In one embodiment, the operation of the VM is suspended by the first VMM to extract GPU state information from the first GPU. Once the operation of the VM 404 is suspended, the first VMM assumes control of the first GPU and then accesses the context module. The first VMM then extracts GPU state information related to the first GPU from the context module in an intermediary GPU state representation format. In another embodiment, the operation of VM is not suspended. Instead, the first VMM initiates an event for a graphics driver associated with the first GPU to export its state information. The context module receives instructions from the graphics driver to convert the GPU state information related to the first GPU into an intermediary GPU state representation format. The converted GPU state information is then exported in the intermediary GPU state representation format to the first VMM.

The migration of the VM from the first VM host the second VM host is initiated by the first VMM providing non-GPU operating state information of the VM to the second VMM. The first VMM then conveys the GPU state information in the intermediary GPU state representation format to the second VMM. The second VMM then accesses a context module coupled to the second GPU and provides the GPU state information related to the first GPU, which is stored in the intermediary state representation format. Once received, the context module converts the GPU state information related to the first GPU from the intermediary GPU state representation format to the native GPU state representation format of the second GPU. Once converted, the GPU state information of the first GPU is restored to the second GPU in its native GPU state representation format by the second VMM. Thereafter, the non-GPU operating state information related to the VM is restored by the second VMM, which then initiates operation of the VM on the second VM host.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
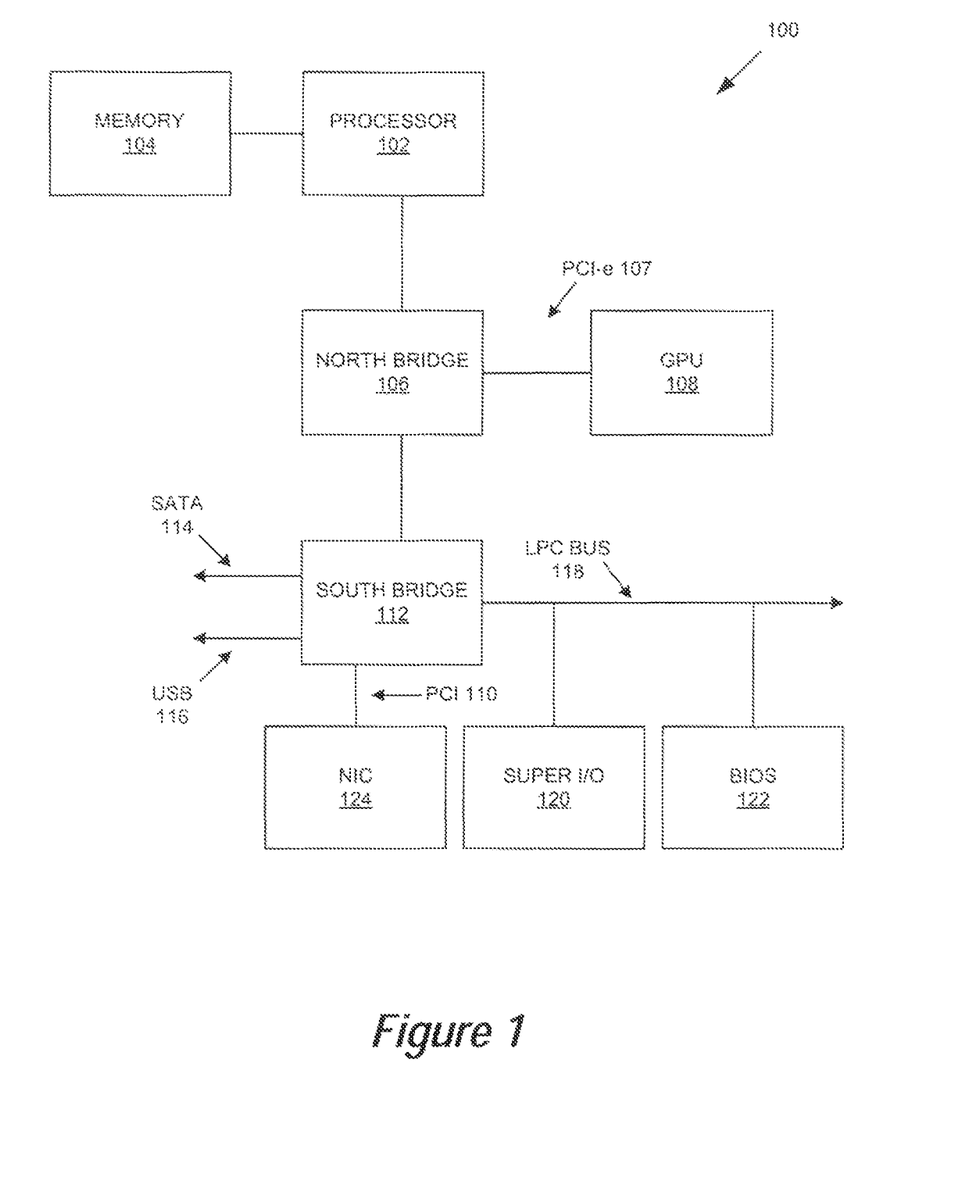
FIG. 1 is a simplified block diagram of a conventional computer system as implemented in accordance with an embodiment of the invention.

FIG. 1 illustrates an example architecture for a conventional computer system 100 as implemented in accordance with an embodiment of the invention. The computer system 100 includes a processor 102, a fast or "north" bridge 104, system memory 106, graphics processing unit 108, a network interface card (NIC) 124, a Peripheral Component Interconnect (PCI) bus 110, a slow or "south" bridge 112, a serial AT Attachment (SATA) interface 114, a universal serial bus (USB) interface 116, a Low Pin Count (LPC) bus 118, a super input/output controller chip (SuperI/O) 120, and BIOS memory 122. It will be appreciated that other buses, devices, and/or subsystems may be included in the computer system 100 as desired, such as caches, modems, parallel or serial interfaces, Small Computer System Interconnect (SCSI) interfaces, etc. Also, the north bridge 106 and the south bridge 112 may be implemented with a single chip or a plurality of chips, leading to the collective term "chipset."

As depicted, the processor 102 is coupled to the system memory 106, and through the north bridge 106 as an interface, to the GPU 108. The north bridge 104 typically provides high speed communications between the CPU 102 and the south bridge 112. In turn, the south bridge 112 provides an interface between the north bridge 104 and various peripherals, devices, and subsystems coupled to the south bridge 112 via the PCI bus 110, SATA interface 114, USB interface 116, and the LPC bus 118. For example, the super I/O chip 120 and BIOS chip 122 are coupled to the south bridge 112 via the LPC bus 118, while removable peripheral devices (e.g., NIC 109) are connected to the south bridge 112, or inserted into PCI "slots," that connect to the PCI bus 110.

Figure 2:
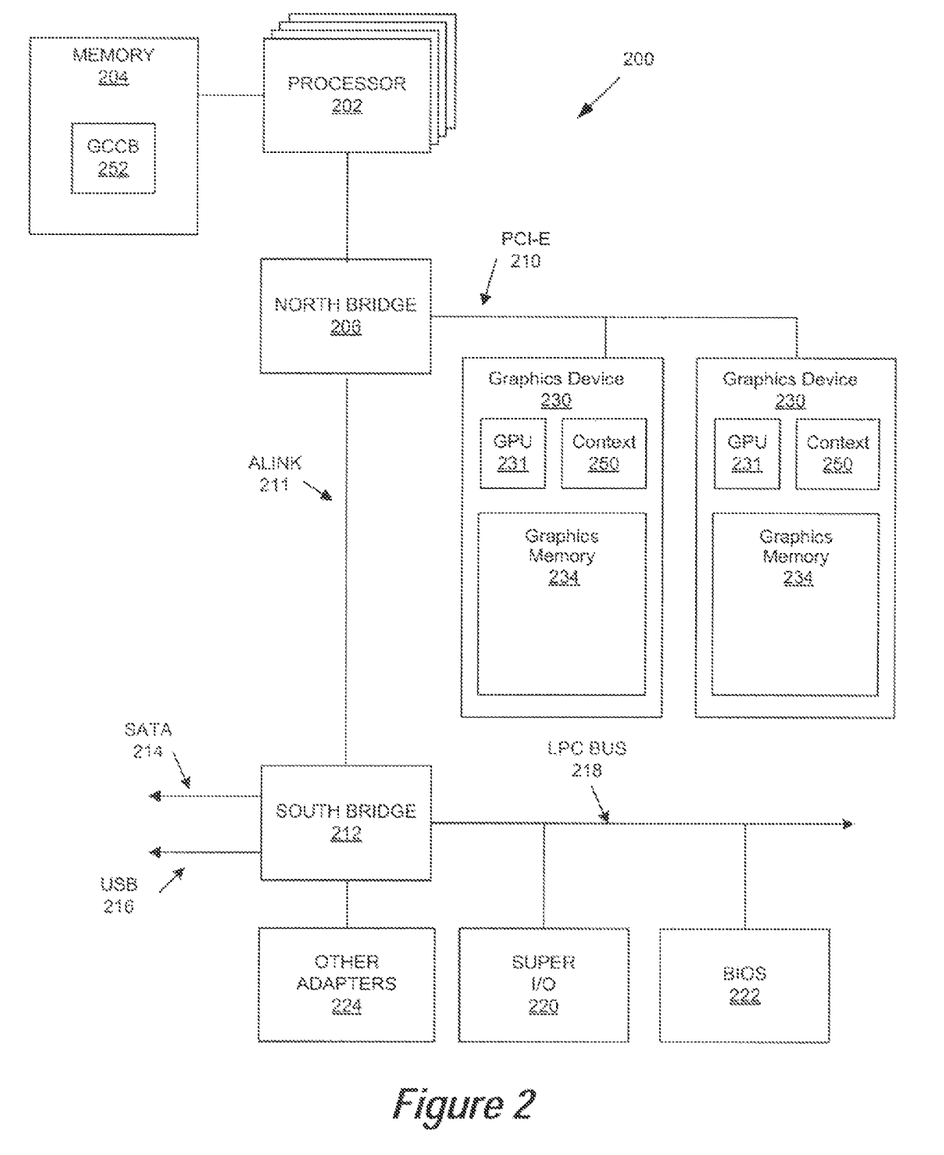
FIG. 2 is a simplified block diagram of a computer system having an integrated GPU, NIC, and compression hardware device as implemented in accordance with selected embodiments of the invention.

Turning now to FIG. 2, there is depicted a simplified architectural block diagram of a computer system 200 having a plurality of graphics devices 230 in accordance with selected embodiments of the present invention. The depicted computer system 200 includes one or more processors or processor cores 202, a north bridge 204, memory 206, a plurality of graphics devices 230, a PCI Express (PCI-E) bus 210, a PCI bus 211, a south bridge 212, an AT Attachment (ATA) or IDE interface 214, a USB interface 216, an LPC bus 218, an super input/output controller chip 220, and an BIOS memory 222 as well as other adapters 224. As will be appreciated, other buses, devices, and/or subsystems may be included in the computer system 200 as desired, e.g. caches, modems, parallel or serial interfaces, SCSI interfaces, etc. In addition, the computer system 200 is shown as including both a north bridge 204 and a south bridge 212, but the north bridge 204 and the south bridge 212 may be implemented with only a single chip or a plurality of chips in the "chipset," or may be replaced by a single north bridge circuit.

By coupling the processor 202 to the north bridge 204, the north bridge 204 provides an interface between the processor 202, the memory 206, the graphics devices 230 (and PCI-E bus 210), and the PCI bus 211. The south bridge 212 provides an interface between the PCI bus 211 and the peripherals, devices, and subsystems coupled to the IDE interface 214, the USB interface 216, and the LPC bus 218. The Super I/O chip 220 and the BIOS 222 are coupled to the LPC bus 218.

The north bridge 204 provides communications access between and/or among the processor 202, memory 206, the graphics device 230 (and PCI-E bus 210), and devices coupled to the PCI bus 211 through the south bridge 212. In addition, removable peripheral devices may be inserted into PCI slots (not shown) connected to the PCI bus 211. The south bridge 212 also provides an interface between the PCI bus 211 and various devices and subsystems, such as a modem, a printer, keyboard, mouse, etc., which are generally coupled to the computer system 200 through the LPC bus 218 (or its predecessors, such as the X-bus or the ISA bus). The south bridge 212 includes logic used to interface the devices to the rest of computer system 200 through the IDE interface 214, the USB interface 216, and the LPC bus 218.

The computer system 200 may be part of central host server which hosts data and applications for use by one or more remote client devices. For example, the central host server may host a centralized graphics solutions which supplies one or more video data streams for display at remote users (e.g. a laptop, PDA, etc.) to provide a remote PC experience. To this end, the graphics devices 230 are attached to the processor(s) 202 over a high speed, high bandwidth PCI-Express bus 210. Each graphics device 230 includes one or more GPUs 231 as well as graphics memory 234 all packaged together on a single industry standard add-in card. In operation, the GPU 231 generates computer graphics in response to software executing on the processor(s) 202. In particular, the software may create data structures or command lists representing the objects to be displayed. Rather than storing the command lists in the system memory 206, the command lists are stored in the graphics memory 234 where they may be quickly read and processed by the GPU 231 to generate pixel data representing each pixel on the display. The processing by the GPU 231 of the data structures to represent objects to be displayed and the generation of the image data (e.g. pixel data) is referred to as rendering the image. The command list/data structures may be defined in any desired fashion to include a display list of the objects to be displayed (e.g., shapes to be drawn into the image), the depth of each object in the image, textures to be applied to the objects in various texture maps, etc. For any given data stream, the GPU 231 may be idle a relatively large percentage of the time that the system 200 is in operation (e.g. on the order of 90%), but this idle time may be exploited to render image data for additional data streams without impairing the overall performance of the system 200. The GPU 231 may write the pixel data as uncompressed video to a frame buffer in the graphics memory 234 by generating write commands which are transmitted over a dedicated communication interface to the graphics memory 234. However, given the high-speed connection configuration, the GPU 231 may instead write the uncompressed video data may to the system memory 206 without incurring a significant time penalty. Thus, the frame buffer may store uncompressed video data for one or more data streams to be transmitted to a remote user.

Wherever stored, one or more audio and/or video compression techniques may be applied to the uncompressed video data. Any of a variety of video compression techniques can be implemented within the graphics device 230, such as intraframe compression and interframe compression which operate to compress video information by reducing both spatial and temporal redundancy that is present in video frames. To implement data compression, the integrated graphics device 230 can includes a compression unit which provides dedicated hardware and/or software for performing intraframe compression, interframe compression, such as by performing spatial or block-based encoding using a discrete cosine transform (DCT) coding scheme, quantization, run-level encoding, variable length coding or using other entropy encoding technique, such as a Context-based Adaptive Binary Arithmetic Coding (CABAC), Context Adaptive Variable Length Coding (CAVLC) and the like. In operation, the compression unit retrieves the uncompressed video from the graphics memory 234 by generating read commands which are transmitted over a dedicated communication interface to the graphics memory 234. The retrieved data is then compressed at the compression unit to reduce the quantity of data used to represent audio/video information. The compression unit may then write the compressed video data over the dedicated communication interface to a buffer in the graphics memory 234, though the compressed video data may instead be stored in the system memory 206. Thus, the buffer may store compressed video data for one or more data streams to be transmitted to a remote user.

To deliver the compressed video data stream(s) to the remote users, the integrated graphics device 230 can include a network interface controller (NIC) device. The NIC (also referred to as a network card, network adapter, LAN Adapter or network interface card) is a dedicated hardware circuit that is designed to allow computers to communicate over a computer network using a predetermined communication protocol. The NIC includes hardware circuitry which is provided to receive and transmit signals to and from a communication network (e.g., the Internet or another computer network) using a predetermined communication protocol, such as TCP/IP, thereby allowing the computer system 200 to connect to remote users/client devices (not shown). In operation, the NIC retrieves the compressed video from the graphics memory 234 by generating read commands which are transmitted over a dedicated communication interface to the graphics memory 234. The retrieved data is then processed at the NIC to produce an outbound video data stream that is formatted in accordance with a particular network communication standard. The NIC may also process the outbound data stream(s) in accordance with a remote display protocol, such as RDP, ICA, VNC, RGS or other proprietary schemes.

By connecting the GPU 231 to the graphics memory 234 with dedicated communication interfaces, there is no need to read or write data over the PCI bus 211 and south bridge circuit 212, thereby freeing the other resources in the computer system 200 for other operations. In addition, the connection of the graphics device 230 over the high speed PCI-E bus 210 allows software control of the video processing to proceed expeditiously as compared to conventional configurations where the GPU is connected to the south bridge. In addition to reducing contention problems in the computer system 200, the graphics device 230 increases the overall processing speed for rendering, compressing and transmitting graphics information, which not only improves the remote experience, but allows multiple remote users to be supported by a single host computer system.

The computer system 200 also provides for efficient migrating of a GPU context as a result of a context switching operation. More specifically, the efficient migrating provides each graphics device 230 with a context switch module 250 which accelerates loading and otherwise accessing context data representing a snapshot of the state of the graphics device 230. The snapshot includes its mapping of GPU content of external memory buffers.

The context data includes an order list of any input graphics commands that have not been completed. This information is written to a graphics context control block (GCCB) 252 which is stored within a contiguous area of memory 204. Also, in operation, the graphics device 230 can accept a pointer to a previously written GCCB 252 and a resume command from software or some other external agent. The pointer may be provided well in advance of when another graphics device 230 might be writing out to a GCCB 252. The context switch module 250 can include a set of semaphores (e.g., hardware semaphores) which is used to synchronize access to the contents of the GCCB 252 and then to individual resources that may be referenced within the GCCB. The set of semaphores synchronize and coordinate events within each of the plurality of graphics devices.

When granted access, the new GPU is able to read in the contents of the GCCB 252, placing the information in appropriate internal registers, translation look aside buffers (TLBs), page tables, etc. of the graphics device 230 and allows the graphics device 230 to resume processing of the context starting from the point at which the context was suspended. The memory address pointer at which the GCCB 250 is to be written or read can be supplied programmatically by software, transferred to the graphics device 230 over an attachment bus or port, or supplied from an internal register within the graphics device 230.

The agent that initiates the transfer of the content of the GCCB 252 may be a processor 202, another GPU 231 or other hardware device. Other triggering events such as exceeding a preprogrammed processing time limit or an internal hardware error may also initiate saving of a GCCB 252 to memory 204.

Figure 3:
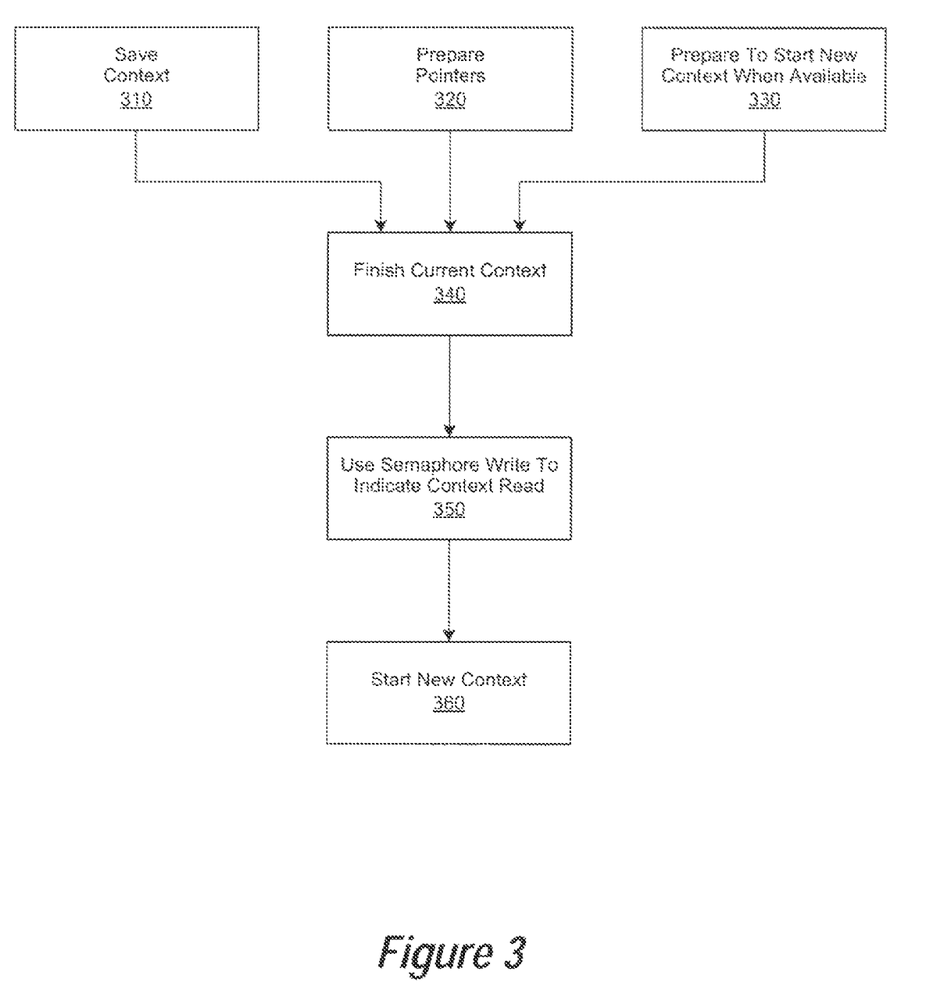
FIG. 3 is a simplified flow methodology for performing an efficient context save and restore for hosted graphics.

Turning now to FIG. 3, an exemplary method is illustrated for performing an efficient context save and restore for hosted graphics. More specifically, at step 310, the context module 250 (or the various context modules in communication with each other) commands a first graphics device (e.g., GPU0) to save its current context. Also, as step 320, the context module 250 prepares pointes and state copy commands for another graphics device (e.g., GPU1) to start this context when it is available. Also, at step 330, the context module 250 commands the other graphics device to start this context when the device becomes available. Each of steps 310, 320 and 330 may be performed substantially in parallel. That is, none of these steps require results from other of the steps before completing.

After steps 310, 320 and 330 are completed, the context module 250 controls the operation of the first graphics device so that the device finishes a current context, save the context and then uses a semaphore write operation to indicate that the context data has been saved and that access to this data by the first graphics device is relinquished at step 350. Next, at step 360, the other graphics device starts executing using its context data. Before starting operation, the other graphics device reads the semaphores from the context module 250 to validate that the graphics device is accessing the appropriate context data.

Figure 4:
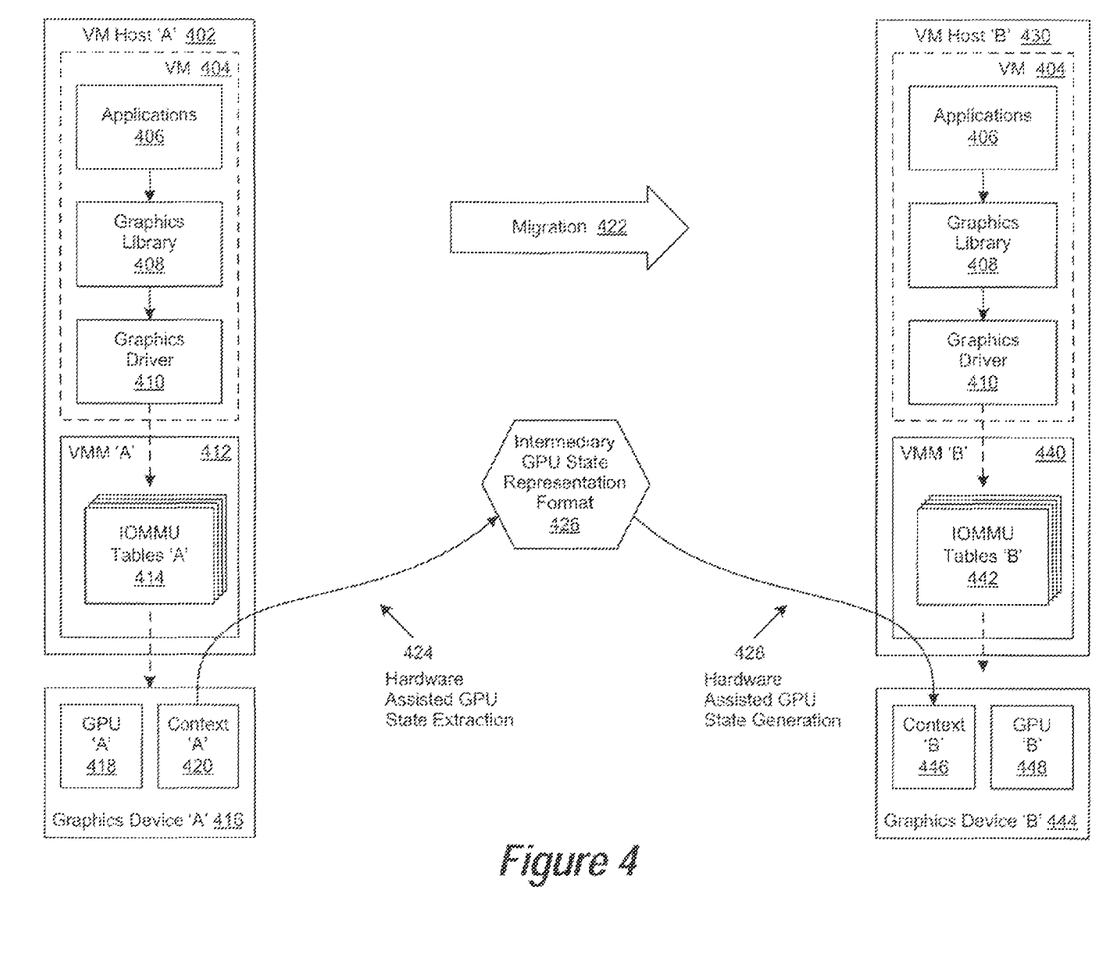
FIG. 4 is a simplified block diagram of the recreation of GPU state information from an intermediary GPU state representation format during the migration of a virtual machine (VM)

FIG. 4 is a simplified block diagram of the recreation of GPU state information from an intermediary GPU state representation format as implemented in accordance with an embodiment of the invention during the migration of a virtual machine (VM). In various embodiments, a context module coupled to a first GPU is operable to convert GPU state information stored in a native GPU state representation format into an intermediary GPU state information format. A context module coupled to a target GPU is likewise operable to convert GPU state information stored in the intermediary GPU state information format into the native GPU state representation format of the target GPU.

In this embodiment, virtual machine (VM) host 'A' 402 comprises VM 404 and virtual machine manager (VMM) 'A' 412. VM 404 further comprises applications 406, graphics library 408, and graphics driver 410. VMM 'A' 412 further comprises input/output (I/O) memory management unit (IOMMU) tables 'A' 414. VM host 'A' 402 is coupled to graphics device 'A' 416, which comprises graphics processing unit (GPU) 'A' 418 coupled to a context module 'A' 420, as described in greater detail herein. Virtual machine (VM) host 'B' 430 likewise comprises VM 404 and virtual machine manager (VMM) 'B' 440. VMM 'B' 440 further comprises IOMMU tables 'B' 442. VM host 'B' 430 is coupled to graphics device 'B' 444, which comprises a GPU 'B' 446 coupled to a context module 'B' 448. In various embodiments, the GPU state information associated with the GPU 'A' 418 is stored in a first GPU state representation format and the GPU state information associated with GPU 'B' 448 is stored in a second GPU state representation format.

In one embodiment, the operation of the VM 404 is suspended by the VMM 'A' 412 to extract GPU state information from GPU 'A' 418. Once the operation of the VM 404 is suspended, the VMM 'A' 412 first assumes control of the GPU 'A' 418 and then accesses the context module 'A' 420. The VMM 'A' 412 then extracts 424 GPU state information related to the GPU 'A' 418 from the context module 'A' 420 in an intermediary GPU state representation format 426. In another embodiment, the operation of VM 404 is not suspended by VMM 'A' 412 to extract GPU state information from GPU 'A' 418. Instead, the VMM 'A' 412 initiates an event for a graphics driver 410 associated with the GPU 'A' 418 to export GPU state information related to the GPU 'A' 418. The context module 'A' 420 coupled to the GPU 'A' 418 receives instructions from the graphics driver 410 to convert the GPU state information related to the GPU 'A' 418 into an intermediary GPU state representation format. The converted GPU state information is then exported 424 in an intermediary GPU state representation format 426 to the VMM 'A' 412 by the context module 'A' 420. The VMM 'A' 412 then saves non-GPU operating state information related to the VM 404.

The migration of the VM 404 from the VM host 'A' 402 to the VM host 'B' 430 is initiated by VMM 'A' 412 providing the non-GPU operating state information of the VM 404 to the VMM 'B' 440. The GPU state information related to the GPU 'A' 418 that is stored in an intermediary GPU state representation format 426 is then provided 428 by the VMM 'A' 412 to the VMM 'B' 440. Thereafter, the VMM 'B' 440 receives the non-GPU operating state information related to the VM 404 and the GPU state information related to the GPU 'A' 418.

The VMM 'B' 440 then accesses the context module 'B' 446 coupled to the GPU 'B' 448 of the second graphics device 444. Once accessed, VMM 'B' 440 provides 428 the GPU state information related to the GPU 'A' 418 stored in the intermediary state representation format 426 to the context module 'B' 446. Once received, the context module 'B' 446 converts the GPU state information related to the GPU 'A' 418 from the intermediary GPU state representation format 426 to the native GPU state representation format of the GPU 'B' 448. Once converted, the GPU state information of the GPU 'A' 418 is restored to the GPU 'B' 448 in its native GPU state representation format by the VMM 'B' 440. Thereafter, the non-GPU operating state information related to the VM 404 is restored by the VMM 'B' 440. The VMM 'B' 440 then initiates operation of the VM 404 on the VM host 'B' 430.

Figure 5A:
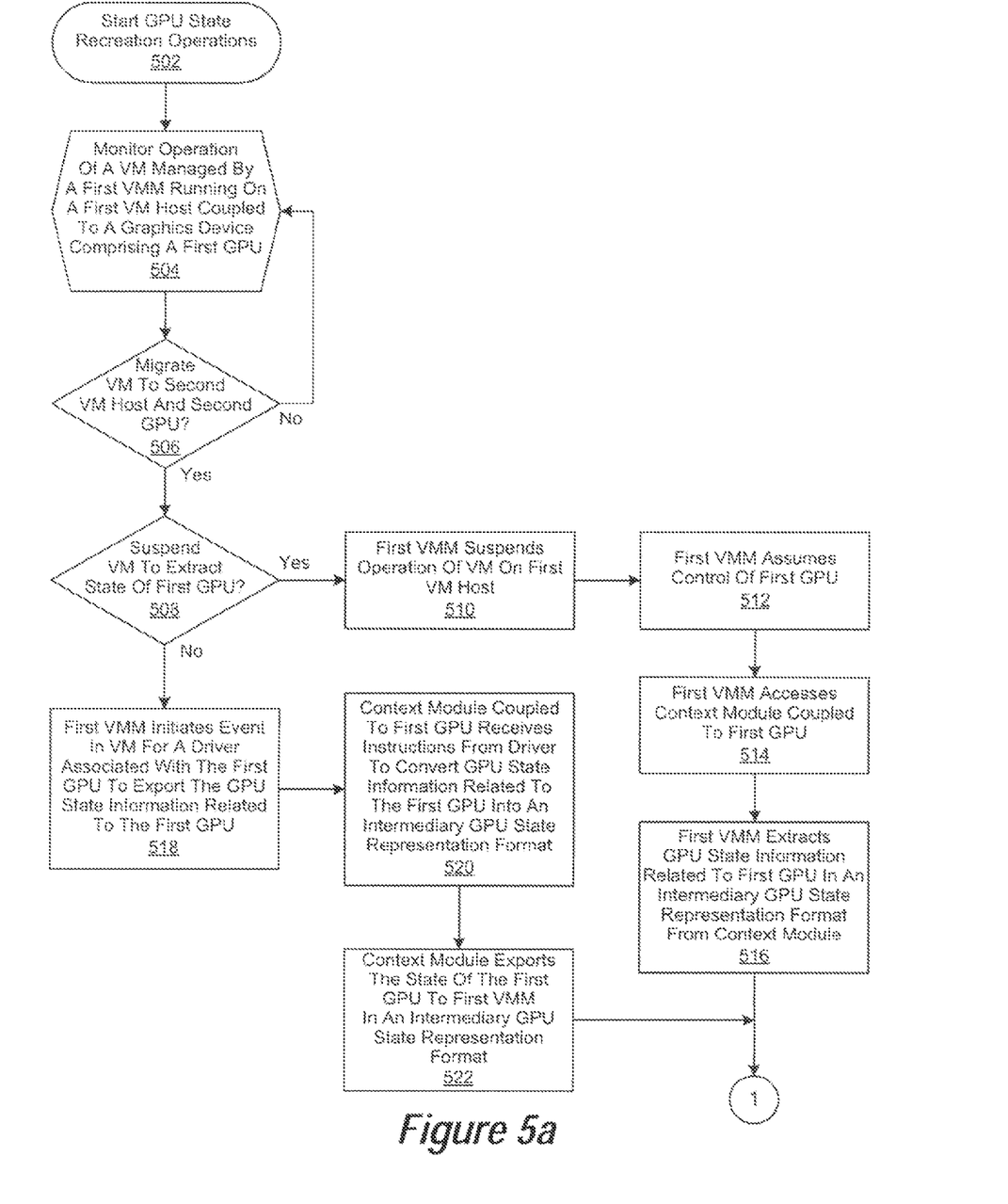
FIGS. 5a-b are a simplified flowchart of the recreation of GPU state information from an intermediary GPU state representation format during the migration of a VM.
Figure 5B:
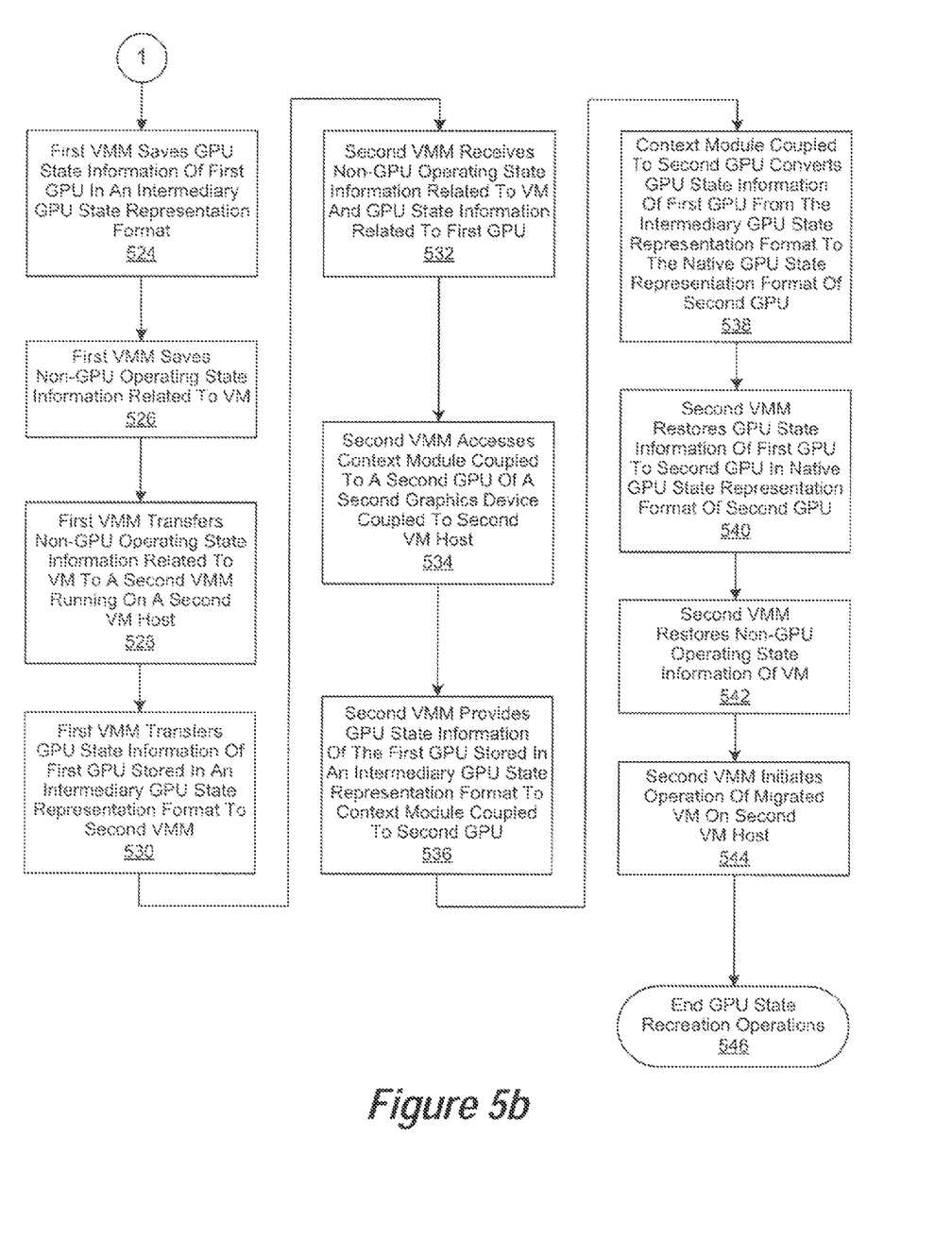

FIGS. 5a-b are a simplified flowchart of the recreation of GPU state information from an intermediary GPU state representation format as implemented in accordance with an embodiment of the invention during the migration of a virtual machine (VM). In this embodiment, GPU state recreation operations are begun in step 502 followed by monitoring the operation of a VM managed by a first virtual machine manager (VMM) running on a first VM host coupled to a first graphic device comprising a first GPU in step 504. A determination is then made in step 506 whether the VM is to be migrated to a second VM host, which in turn is coupled to a second graphic device comprising a second GPU. If not, the process continues, proceeding with step 504.

Otherwise, a determination is made in step 508 whether to suspend the operation of the VM to extract GPU state information from the first GPU. If it is determined in step 508 to suspend the operation of the VM to extract GPU state information from the first GPU, then its operation on the first VM host is suspended by the first VMM in step 510. The first VMM then assumes control of the first GPU in step 512, followed by the first VMM accessing a context module coupled to the GPU in step 514. In step 516, the first VMM extracts GPU state information related to the first GPU from the context module in an intermediary GPU state representation format. In various embodiments, the context module is operable to read GPU state information stored in the native state representation format of a respective GPU and then convert the GPU state information into intermediary GPU state representation format such that it can be read by a VMM.

However, if it is determined in step 508 not to suspend the operation of the VM to extract GPU state information from the first GPU, then the first VMM initiates an event in step 518 for a driver associated with the first GPU to export GPU state information related to the first GPU. The context module coupled to the first GPU then receives instructions from the driver in step 520 to convert the GPU state information related to the first GPU into an intermediary GPU state representation format. The converted GPU state information is then exported in an intermediary GPU state representation format to the first VMM by the context module in step 522.

In step 524, the first VMM saves the GPU state information that was extracted in step 516, or exported in step 522, in an intermediary GPU state representation format. Then, in step 526, the first VMM saves non-GPU operating state information related to the VM. The first VMM then initiates the migration of the VM to the second VM host by providing the non-GPU operating state information of the VM to a second VMM running on a second VM host in step 528. The GPU state information related to the first GPU that is stored in an intermediary GPU state representation format is then provided by the first VMM to the second VMM. Thereafter, the second VMM receives the non-GPU operating state information related to the VM and the GPU state information related to the first GPU in step 532.

The second VMM then accesses a context module coupled to a second GPU of a second graphics device coupled to the second VM host in step 534. Once accessed, the second VMM provides the GPU state information related to the first GPU stored in the intermediary state representation format to the context module in step 536. Once received, the context module coupled to the second GPU converts the GPU state information related to the first GPU from the intermediary GPU state representation format to the native GPU state representation format of the second GPU in step 538. Once converted, the GPU state information of the first GPU is restored to the second GPU in the second GPU's native GPU state representation format by the VMM in step 540. Thereafter, the non-GPU operating state information related to the VM is restored by the second VMM in step 542. The second VMM then initiates operation of the VM on the second VM host in step 544.

As described herein, selected aspects of the invention as disclosed above may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. An apparatus, comprising:
   a memory; and
   a context module operable to:
   convert graphics processing unit (GPU) state information of a virtual machine (VM) that is represented in a first GPU state representation format into an intermediary GPU state representation format that is stored in the memory, wherein the GPU state information of the VM that is represented in the first GPU state representation format is generated by a first GPU of a first VM host during migration of the VM from the first VM host to a second VM host; and
   convert the GPU state information of the VM that is represented in the intermediary GPU state representation format into a second GPU state representation format, wherein the second GPU state representation format is usable by a second GPU of the second VM host to restore the GPU state of the VM in the second VM host.

2. The apparatus of claim 1 wherein:
   the GPU state information stored in the intermediary state representation format is readable by the first VM host and the second VM host during the migration.

3. The apparatus of claim 1 wherein:
   the context module is further operable to control loading of context data representing a snapshot of a state of a first graphics device, the loading of the context data occurring upon a context switch from the first graphics device to a second graphics device during the migration.

4. The apparatus of claim 3 wherein:
   the snapshot of the state of the first graphics device comprises a mapping of GPU content of external memory buffers.

5. The apparatus of claim 3 wherein:
   the context data comprises an order list of any input graphics commands that have not been completed.

6. The apparatus of claim 3 further comprising:
   a graphics context control block (GCCB) stored in a first system memory, the GCCB storing the context data.

7. The apparatus of claim 6 wherein:
   the first graphics device accepts a pointer to a previously written GCCB and a resume command.

8. The apparatus of claim 3 wherein:
   the context module comprises semaphores, the semaphores being used to synchronize access to contents of the GCCB and then to individual resources that are referenced within the GCCB.

9. The apparatus of claim 3 wherein:
   upon switching context, the context data is stored in internal registers, translation look aside buffers (TLBs), and page tables related to the second graphics device.

10. A method, comprising:
    converting graphics processing unit (GPU) state information of a virtual machine (VM) that is represented in a first GPU state representation format into an intermediary GPU state representation format, wherein the GPU state information of the VM that is represented in the first GPU state representation format is generated by a first GPU of a first VM host during migration of the VM from the first VM host to a second VM host; and converting the GPU state information of the VM that is represented in the intermediary GPU state representation format into a second GPU state representation format, wherein the second GPU state representation format is usable by a second GPU of the second VM host to restore the GPU state of the VM in the second VM host.

11. The method of claim 10 wherein:
the GPU state information stored in the intermediary state representation format is readable by the first VM host and the second VM host during the migration.

12. The method of claim 10 further comprising:
controlling loading of context data representing a snapshot of a state of a first graphics device, the loading of the context data occurring upon a context switch from the first graphics device to a second graphics device during the migration.

13. The computer graphics processing method of claim 12 wherein:
the snapshot of the state of the first graphics device comprises a mapping of GPU content of external memory buffers.

14. The method of claim 12 wherein:
the context data comprises an order list of any input graphics commands that have not been completed.

15. The method of claim 12 further comprising:
storing the context data within a graphics context control block (GCCB) stored in a first system memory.

16. The method of claim 15 wherein:
the first graphics device accepts a pointer to a previously written GCCB and a resume command.

17. The method of claim 15 wherein:
the context module comprises semaphores, the semaphores being used to synchronize access to contents of the GCCB and then to individual resources that are referenced within the GCCB.

18. The computer graphics processing method of claim 12 wherein:
upon switching context, the context data is stored in internal registers, translation look aside buffers (TLBs), and page tables related to the second graphics device.

* * * * *